United States Patent [19]

Bills

[11] 3,994,197

[45] Nov. 30, 1976

[54] FOOTPEDAL DRIVE FOR SIMULATING TAMBOURINE HAND-STRIKING

[76] Inventor: John E. Bills, Apt. C, 7914 Shoals Drive, Orlando, Fla. 32807

[22] Filed: Aug. 7, 1975

[21] Appl. No.: 602,770

[52] U.S. Cl. .................................. 84/418; 84/422 R

[51] Int. Cl.[2] .......................................... G01D 13/02

[58] Field of Search .............. 84/418, 422, 411, 421

[56] References Cited

UNITED STATES PATENTS

| | | | |
|---|---|---|---|
| 2,475,542 | 7/1949 | Boykins | 84/422 |
| 2,658,421 | 11/1953 | Clayton | 84/422 |
| 2,785,596 | 3/1957 | Korosh | 84/422 |
| 2,893,284 | 7/1959 | Washington, Jr. | 84/422 |
| 3,481,239 | 12/1969 | Blumenfeld | 84/418 |

FOREIGN PATENTS OR APPLICATIONS

| | | | |
|---|---|---|---|
| 1,698 | 11/1916 | Netherlands | 84/422 |

*Primary Examiner*—Stephen J. Tomsky
*Attorney, Agent, or Firm*—John F. McClellan, Sr.

[57] ABSTRACT

A rocking footpedal mechanism for driving a tambourine or similar percussion instrument in fore-and-aft oscillation about a pivotal arrangement below the tambourine, the pivotal arrangement and the tambourine-holding shank are so located at one end of the footpedal as to cause the tambourine to strike the leg above a musician's foot operating the footpedal, simulating conventional hand-striking of the tambourine, while leaving the musician's hands free; double action provides positive control of both half-cycles of tambourine oscillation and the pivotal arrangement is preferably spring mounted to provide secondary oscillations when desired.

14 Claims, 3 Drawing Figures

FOOTPEDAL DRIVE FOR SIMULATING TAMBOURINE HAND-STRIKING

This invention relates generally to musical instruments and specifically to tambourine-type percussion instruments.

"Tambourine" is defined as "a small drum; especially: a shallow one-headed drum with loose metallic disks at the sides played by shaking, striking with the hand, or rubbing with the thumb" in the current edition of a leading dictionary. Of the three modes of playing thus set out, hand striking, perhaps is the most useful in modern music, the most often used, and offers the greatest volume and greatest variety of expression.

Manipulation in hand striking usually consists essentially in contacting the hoop of the instrument, held in one hand, with the other hand. Soft impacts create jingles; harder impacts add percussive sharpness, but this classic method engages both hands.

In the prior art, it is disclosed to free the hands for other work while creating jingles by a foot-actuated mechanism holding and simply vertically oscillating a tambourine, by U.S. Pat. No. 3,481,239 granted Dec. 2, 1969, to L. Blumenfeld, for "Tambourine Jingle Rim Supporting and Actuating Mechanism." This disclosure indicates that the tambourine, mounted as specified, can "be foot operated by means of foot actuation of the pedal—about its pivot or it can, in the alternative, be hand operated by hand impact on the rim or otherwise of the tambourine while in mounted position." Significantly, hand-impact operation is in the alternative to foot operation.

In contrast, objects of the present invention are to provide in a tambourine type instrument simulated hand-impact operation through foot operation positively controllable throughout the rocking cycle to provide a full range of light-to-heavy percussive effects in the full range of frequencies normally employed, and with the optional feature of operation in the shaking mode alone, or interspersed with percussive effects. Further objects are to prove an instrument as described having drive linkage providing resonance for a natural "feel" when played, and which is compact, durable, unobtrusive but attractive in appearance, economical to make and to purchase, and safe and reliable for continual professional or amateur use.

In brief summary given for purposes of cursive description only, the invention includes in the preferred embodiment a rocking footpedal driving a spring-pivoted upright member having a tambourine affixed at the top in position to oscillate against and away from a musician's leg adjacently above the musician's foot rocking the footpedal.

The above objects and advantages of the invention, will become more readily apparent upon examination of the following description including the drawings in which.

In the Figures, like reference numerals denote like elements.

STRUCTURE

Figure 1:
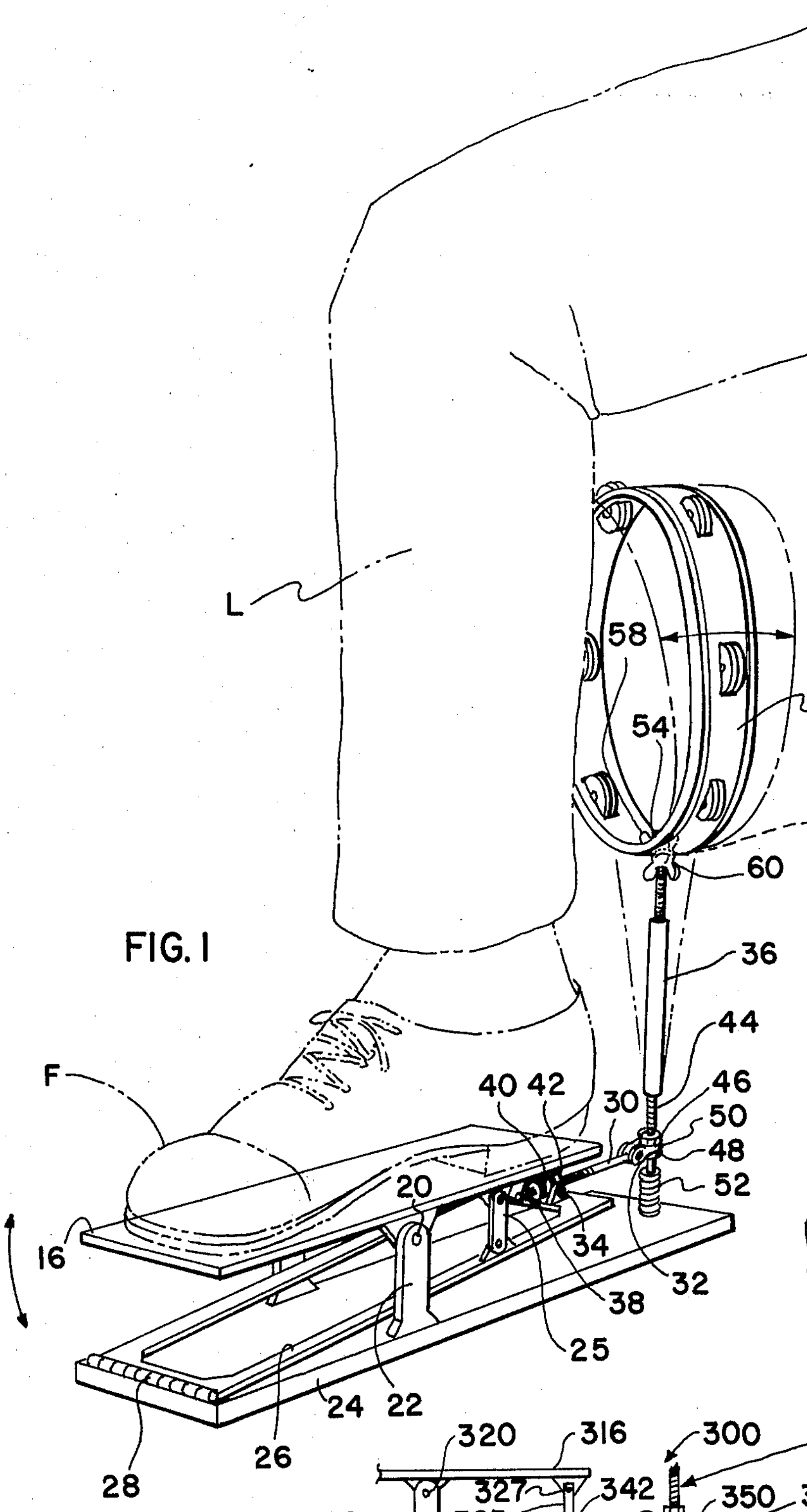
FIG. 1 is an isometric view of the invention in use.

FIG. 1 shows the invention 10 with the foot F of a musician rocking the actuating pedal 16 to oscillate a tambourine 18 toward and away from the leg L of the musician adjacently above the foot.

By means of preferably paired structure including a double-action linkage, of which the following is the preferred example, the amplitude and frequency of oscillation are positively controlled to provide simulative hand-impact of tambourine with leg, or to provide simulative hand-shaking of the tambourine, or to provide a snare-type vibration, or any combination of these modes of tambourine operation.

Pivot structure 20, attaches an intermediate portion of the length of the pedal to a fixed upward extension 22 of a base 24, provides for heel-and-toe rocking actuation of the pedal.

The base and pedal preferably extend forwardly about the same distance and the base extends rearwardly beyond the pedal.

Means responsive to pedal movement to oscillate the tambourine toward and away from a position over the base preferably include a double-pivot link 25 attaching the pedal to an arm 26 attached to a forward part of the base by a hinge 28 and extending rearwardly past the pedal, means in the form of a substantially rigid member 30 having at the respective ends first 32 and second 34 pivot attachment respectively to an upright elongate shank 36 holding the tambourine on the base, and to the arm.

Means for adjustably varying the distance between the first and second pivot attachments to vary response to the footpedal preferably includes a threaded end 38 on the substantially rigid member and a pair of nuts 40, 42 on the threaded end capturing between them the second pivotal attachment.

Means for adjustably affixing the first pivotal attachment at a preselected location along the length of the elongate shank for varying the response to the footpedal preferably includes a threaded portion 44 of the elongate shank with two nuts 46, 48 on the threaded portion capturing a perforate extension 50 of the first pivotal attachment.

The elongate member has at the bottom a yielding connection with the base in the form of a spring 52 which may by a coil spring conventionally threaded into and soldered in the base and similarly threaded onto and the threaded portion of the upright member. Spring-constant may advantageously be such as to define resiliently a position of rest for the elongate shank and tambourine intermediate the oscillation amplitude, the restoring force so provided adding to the "natural" feel under the foot of the musician. Further to the same end, the spring softens the action of the instrument by yielding slightly to the thrust of the linkage. A still further advantage of the spring is to provide a "shivering" or snare type shake through secondary vibration when sharply actuated and then permitted to vibrate freely about the defined position of rest. A tight-coil preload spring works best.

The elongate shank preferably holds the tambourine oriented in a vertical plane substantially perpendicular to the pedal assembly so that the rim can upon oscillation strike the upper calf of player, simulating standard hand operation. Means for holding may include provision of a threaded upper end 54 on the elongate shank passing through a radial hole 56 in the tambourine rim and secured by a nut 58, 60 on each side of the tambourine rim. To adjust the height of the tambourine, the nuts may be run up or down the threaded upper end.

OPERATION

Heel-and-toe rocking action see-saws the pedal 16 about the pivot axis at 20, oscillating the arm 26 about hinge 28, driving the rearward end of the arm in an arc drawing the substantially rigid member 30 and the pivotally mounted elongate shank 36 and tambourine 18 non-linearly toward the leg of the user twice each cycle of operation and similarly thrusting it away twice each cycle. Alternatively for slow effects, half-cycle operation is easily achieved by toe rocking alone or heel rocking alone; or the mid-portion may be used for spring-driven secondary oscillation as indicated.

Figure 2:
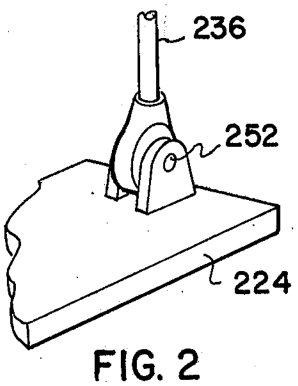
FIG. 2 is an isometric view of an alternative pivot arrangement.

FIG. 2 shows an alternative arrangement in which the upright elongate shank 236 has conventional pivotal affixation 252 to the base 224. Preferred operation is generally as indicated in reference to the FIG. 1 embodiment.

Figure 3:
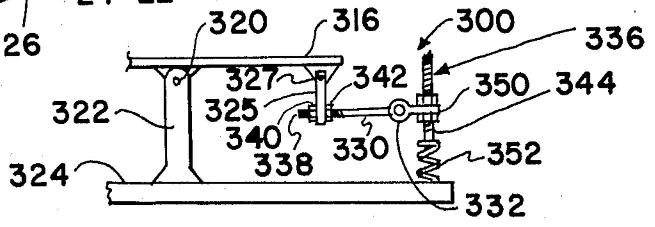
FIG. 3 is a side elevation fragmentary detail on a reduced scale.

FIG. 3 is a fragmentary diagram in side elevation of an alternative actuating mechanism in an embodiment 300 similar to that of FIG. 1 except as shown differently. Base 324 supports fixed upward extension 322 and pivot 320 mounts actuating pedal 316 for double action rocking as before. Substantially rigid member 330 has a threaded end 338 adjustably clamped by nuts 340, 342 to a link 325 pivoted at 327 to the pedal. Through a pivotal attachment 332 having a perforate extension 350 adjustably captured on threaded portion 344 of shank 336 the substantially rigid member is pivotally affixed to the shank, thus directly attaching the pedal to the shank rather than through the intermediate member described before. Simplicity and economy are features of this construction; feel of the "action" is somewhat different.

In all cases, the instrument preferably is arranged as indicated to strike a muscular portion rather than a boney portion of the leg, and to prevent tripping of the musician should the musician after playing walk forward.

Obviously many variations are possible within the scope of the invention. The arrangement disclosed, may be altered to place the tambourine to the front or to the side. And pivot structure and adjustment structure may be employed which differs in detail but not effect from that shown, or non-inventive inclinations of or substitutions for the parts disclosed may be provided, all with the scope of the invention. It is, therefore, to be understood that within the scope of the appended claims the invention may be practiced otherwise than as specifically described.

What is claimed and desired to be secured by United States Letters Patent is:

1. In a musical instrument for oscillating a tambourine having a rim by downward motion of a human foot upon a pedal of an operative pedal-assembly mounting the tambourine, the improvement comprising: means for holding the tambourine substantially in a vertical plane and movably in lateral oscillation adjacent an end of the pedal and at a level above the pedal equal to the nominal location of a portion of a human leg above said a human foot upon the pedal, and means responsive to the pedal for oscillating the means for holding and the tambourine toward and away from a position above said pedal, for thereby adapting the tambourine rim to strike said a human leg portion in simulation of hand-impact upon a tambourine, when oscillated by motion of a human foot upon the pedal.

2. In a musical instrument as recited in claim 1, the means for holding the tambourine including a base, and a substantially upright elongate shank having at the upper end thereof connection with the tambourine and at the lower end thereof a pivotally yielding connection at the base.

3. In a musical instrument as recited in claim 2, said pedal extending in a generally horizontal direction, and pivot structure connecting an intermediate portion of the pedal with the base, whereby rocking motion may be imparted to the pedal upon alternate depression of a first end thereof and a second end thereof by respective heel and toe portions of a human foot.

4. In a musical instrument as recited in claim 3, said yielding connection of the elongate shank with the base comprising a spring.

5. In a musical instrument as recited in claim 4, said spring resiliently defining a position of rest for the elongate shank and tambourine intermediate the amplitude of said oscillation.

6. In a musical instrument as recited in claim 4, said means responsive to the pedal for oscillating the tambourine including: an arm, having first and second ends, a hinge connecting the first end of the arm to the base, means pivotally connecting the pedal and the arm, and means pivotally connecting the arm and the elongate shank.

7. In a musical instrument as recited in claim 6, the base having first and second ends, the elongate shank being at the first end of the base, the hinge being at the second end of the base, and the arm lying beneath the pedal and extending toward the first end of the base.

8. In a musical instrument as recited in claim 6, the means pivotally connecting the pedal to the arm comprising an elongate link with a respective link pivot at each end thereof.

9. In a musical instrument as recited in claim 6, the means pivotally connecting the arm and the elongate shank comprising a substantially rigid member with first and second ends, the first end having a first pivotal attachment and the second end having a second pivotal attachment.

10. In a musical instrument as recited in claim 9, the first pivotal attachment including means for adjustably attaching the first end of the substantially rigid member at a preselected location within a range of locations along the length of the elongate shank.

11. In a musical instrument as recited in claim 10, said means for adjustably attaching including said shank having a threaded portion, said first pivotal attachment having a portion for engaging the elongate shank, and at least one complementarily threaded member on said threaded portion adjustably fixing the position of said engaging portion of the first pivotal attachment.

12. In a musical instrument as recited in claim 10, and means for adjustably varying the distance between said first and second pivotal attachments.

13. In a musical instrument as recited in claim 12, said means for adjustably varying the distance between said first and second pivotal attachments including said second end of the substantially rigid member having a thread, and a complementarily threaded portion of the second pivotal member adjustably engaging said thread.

14. A system for simulating hand-impact operation of a tambourine comprising the steps:

a. Positioning a rocking means at a location for actuation by downward motion of a human foot thereupon;

b. arranging for a tambourine in response to actuation of the rocking means to oscillate laterally away from and against a location above the rocking means which would be occupied by a human leg above a human foot upon the rocking means; and c. actuating the rocking means by said downward motion, thereby simulating hand-impact operation of said tambourine.

* * * * *